(12) United States Patent
Gu

(10) Patent No.: US 7,653,221 B2
(45) Date of Patent: Jan. 26, 2010

(54) METHOD AND APPARATUS FOR AUTOMATIC EYEGLASSES DETECTION AND REMOVAL

(75) Inventor: Kunlong Gu, Sunnyvale, CA (US)

(73) Assignee: Fujifilm Corporation, Tokyo (JP)

( * ) Notice: Subject to any disclaimer, the term of this patent is extended or adjusted under 35 U.S.C. 154(b) by 496 days.

(21) Appl. No.: 11/342,582

(22) Filed: Jan. 31, 2006

(65) Prior Publication Data

US 2007/0177793 A1    Aug. 2, 2007

(51) Int. Cl.
*G06K 9/62* (2006.01)
*G06K 9/66* (2006.01)

(52) U.S. Cl. .................. 382/118; 382/159; 382/254; 382/274; 382/294

(58) Field of Classification Search ............. 382/118, 382/159, 254, 274, 294
See application file for complete search history.

(56) References Cited

U.S. PATENT DOCUMENTS

| | | | |
|---|---|---|---|
| 7,391,900 B2 * | 6/2008 | Kim et al. ............... | 382/164 |
| 2003/0039380 A1 * | 2/2003 | Sukegawa et al. ....... | 382/118 |
| 2005/0105780 A1 | 5/2005 | Ioffe | |
| 2005/0190963 A1 | 9/2005 | Li | |

OTHER PUBLICATIONS

Zhong Jing and Robert Mariani, "Glasses Detection and Extraction by Deformable Contour" In Proc. 15th International Conference on Pattern Recognition, Sep. 2000, pp. 933-936.*
Az Kouzani, "A Fuzzy Neural Network for Extracting Facial Patterns" IEEE XIII Workshop on Neural Networks for Signal Processing, 2003, pp. 699-708.*
Chenyu Wu, Ce Liu, Heung-Yueng Shum, Ying-Qing Xu, and Zhengyou Zhang, "Automatic Eyeglasses Removal from Face Images" IEEE Transactions on Pattern Analysis and Machine intelligence, vol. 26, No. 3, Mar. 2004, pp. 322-336.*
Wu et al., "Automatic Eyeglasses Removal from Face Images", IEEE Transactions on Pattern Analysis and Machine Intelligence, vol. 26, No. 3, Mar. 2004.

* cited by examiner

*Primary Examiner*—Jon Chang
(74) *Attorney, Agent, or Firm*—Birch, Stewart, Kolasch & Birch, LLP

(57) ABSTRACT

A method and an apparatus automatically detect and remove eyeglasses from an image. The method according to one embodiment accesses digital image data representing an image including a face; detects eyeglasses in the image to produce a report about presence or absence of eyeglasses in the image; normalizes illumination of the image to obtain a normalized image; and removes eyeglasses from the normalized image to obtain a face image without eyeglasses.

20 Claims, 14 Drawing Sheets

METHOD AND APPARATUS FOR AUTOMATIC EYEGLASSES DETECTION AND REMOVAL

CROSS-REFERENCE TO RELATED APPLICATION

This non-provisional application is related to co-pending non-provisional application Ser. No. 11/342,588 titled "Method and Apparatus for Automatic Eyeglasses Detection Using a Nose Ridge Mask" filed concurrently herewith on Jan. 31, 2006, the entire contents of which are hereby incorporated by reference.

BACKGROUND OF THE INVENTION

1. Field of the Invention

The present invention relates to a digital image processing technique, and more particularly to a method and apparatus for detecting and removing eyeglasses from a digital image.

2. Description of the Related Art

Face recognition plays an important role in digital image processing techniques concerned with the study of human faces. An important requirement for a successful face recognition system is its robustness against occlusions appearing in images of human faces. Eyeglasses are some of the most common objects that occlude faces. Presence of eyeglasses in images can significantly decrease the performance of a face recognition system. Variability in lighting conditions in face images poses additional challenges to eyeglasses detection and face recognition.

A few publications have studied the impact of occluded regions in a face image on face detection. One such technique is described in US Patent Application 2005/0190963 A1 entitled "Target Object Detecting Method, Apparatus, and Program". The method described in this work detects faces that include occlusions such as eyeglasses. This method, however, is concerned with face detection, and does not detect, remove, or replace eyeglasses in faces. This method also does not address the difficulties caused by variability in lighting conditions of face images.

A disclosed embodiment of the application addresses these and other issues by utilizing a method and apparatus for automatic eyeglasses detection and removal. The method and apparatus automatically detect and remove eyeglasses, and reconstruct the face regions occluded by eyeglasses to produce a face image without eyeglasses.

SUMMARY OF THE INVENTION

The present invention is directed to a method and an apparatus for automatically detecting and removing eyeglasses from an image. According to a first aspect of the present invention, a method of automatically detecting and removing eyeglasses from an image comprises: accessing digital image data representing an image including a face; detecting eyeglasses in the image to produce a report about presence or absence of eyeglasses in the image; normalizing illumination of the image to obtain a normalized image; and removing eyeglasses from the normalized image to obtain a face image without eyeglasses.

According to a second aspect of the present invention, an apparatus for automatically detecting and removing eyeglasses from an image comprises: an image data unit for providing digital image data representing an image including a face; an eyeglasses detection unit for detecting eyeglasses in the image to produce a report about presence or absence of eyeglasses in the image; an illumination normalization unit for normalizing illumination of the image to obtain a normalized image; and an eyeglasses removal unit for removing eyeglasses from the normalized image to obtain a face image without eyeglasses.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
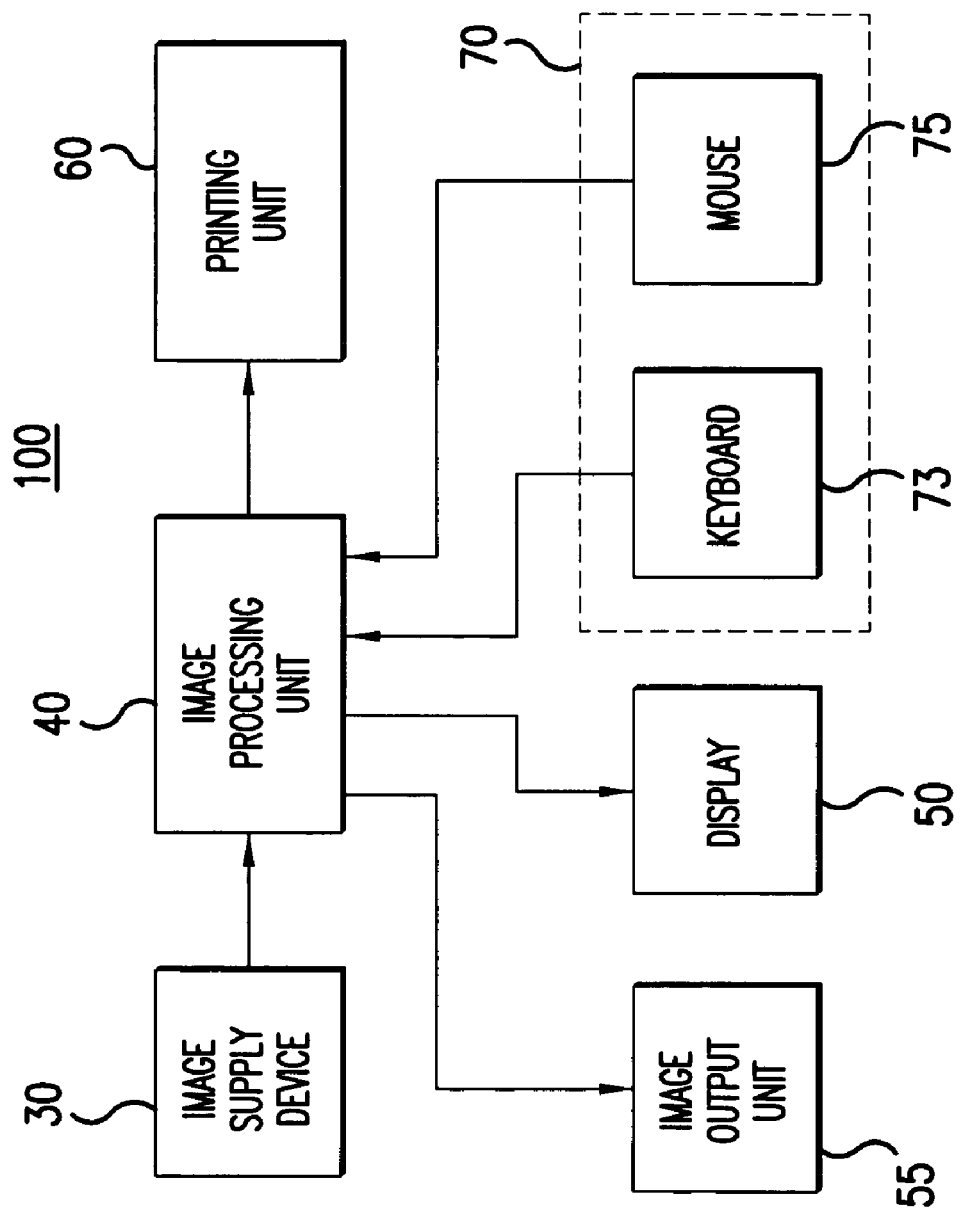
FIG. 1 is a block diagram of a system including an image processing unit for automatic eyeglasses detection and removal according to an embodiment of the present invention.

Aspects of the invention are more specifically set forth in the accompanying description with reference to the appended figures. FIG. 1 is a block diagram of a system including an image processing unit for automatic eyeglasses detection and removal according to an embodiment of the present invention. The system 100 illustrated in FIG. 1 includes the following components: an image supply device 30; an image processing unit 40; a display 50; an image output unit 55; a user input unit 70; and a printing unit 60. Operation of the system 100 in FIG. 1 will become apparent from the following discussion.

The image supply device 30 provides digital image data. The digital image data includes images of human faces. The images in digital image data may include additional objects and bodies besides human faces. Image supply device 30 may be one or more of any number of devices providing digital image data, such as: a scanner for scanning black and white or color images recorded on film; a digital camera; a recording medium such as a CD-R, a floppy disk, a USB drive, etc.; a database system which stores images; a network connection; an image processing system that processes digital data, such as a computer application that processes images; etc.

The image processing unit 40 receives digital image data from the image supply device 30 and performs eyeglasses detection and removal in a manner discussed in detail below. A user may view outputs of image processing unit 40, including intermediate results of eyeglasses detection and removal, via display 50, and may input commands to the image processing unit 40 via the user input unit 70. In the embodiment illustrated in FIG. 1, the user input unit 70 includes a keyboard 73 and a mouse 75. In addition to performing automatic eyeglasses detection and removal in accordance with embodiments of the present invention, the image processing unit 40 may perform additional image processing functions in accordance with commands received from the user input unit 70. The processed image data from image processing unit 40 may be returned as an image file, e.g., via a portable recording medium or via a network (not shown). The output of image processing unit 40 may also be sent to image output unit 55 that may perform further operations on the image data, for various purposes. The image output unit 55 may be: a module that performs further processing of the image data; a database that collects and compares images; etc.

Figure 2:
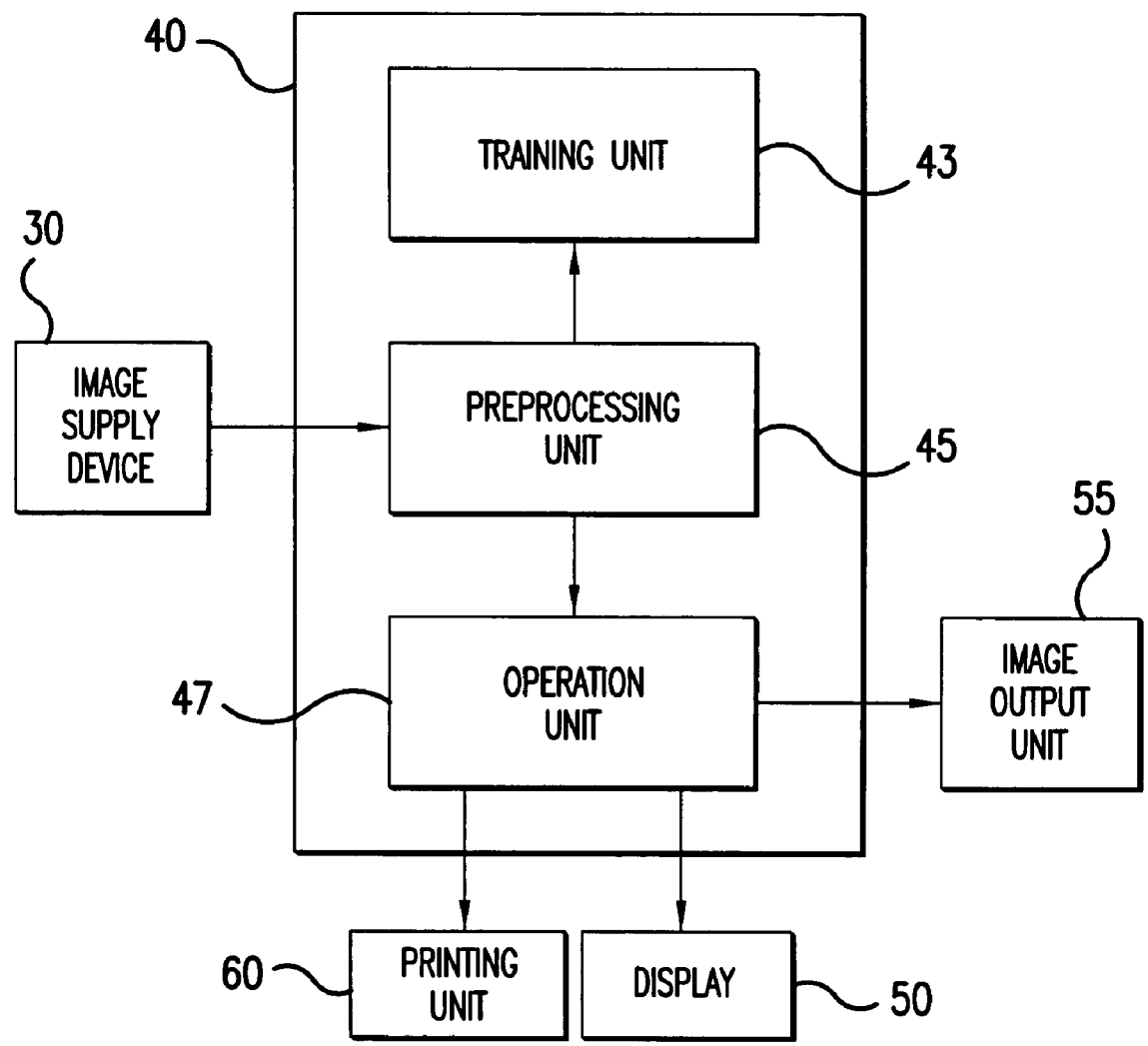
FIG. 2 is a block diagram of an image processing unit for automatic eyeglasses detection and removal according to an embodiment of the present invention illustrated in FIG. 1.

FIG. 2 is a block diagram of an image processing unit 40 for automatic eyeglasses detection and removal according to an embodiment of the present invention illustrated in FIG. 1. As shown in FIG. 2, the image processing unit 40 according to this embodiment includes: a training unit 43; a preprocessing unit 45; and an operation unit 47. Operation of the image processing unit 40 can generally be divided into two stages: (1) training; and (2) automatic eyeglasses detection and removal. Operation of the components included in the image processing unit 40, as well as the principles involved in the training and automatic eyeglasses detection and removal stages for an implementation of the present invention will be next described with reference to FIGS. 3-8.

Generally, the arrangement of elements for the image processing unit 40 illustrated in FIG. 2 performs preprocessing of digital image data, training in detection and removal of eyeglasses from digital image data, and detection and removal of eyeglasses. Preprocessing unit 45 receives digital image data from image supply device 30 and performs preprocessing operations on digital image data. Preprocessing operations of digital image data may include resizing, cropping, compression, color correction, etc. In the training stage, preprocessing unit 45 sends preprocessed digital image data to training unit 43, which trains in eyeglasses detection and removal and accumulates training knowledge.

Preprocessing unit 45 sends preprocessed digital image data to operation unit 47 during the automatic eyeglasses detection and removal stage. Operation unit 47 uses training knowledge while performing automatic eyeglasses detection and removal. Operation unit 47 may output digital image data to image output unit 55, printing unit 60, and/or display 50.

Figure 3:
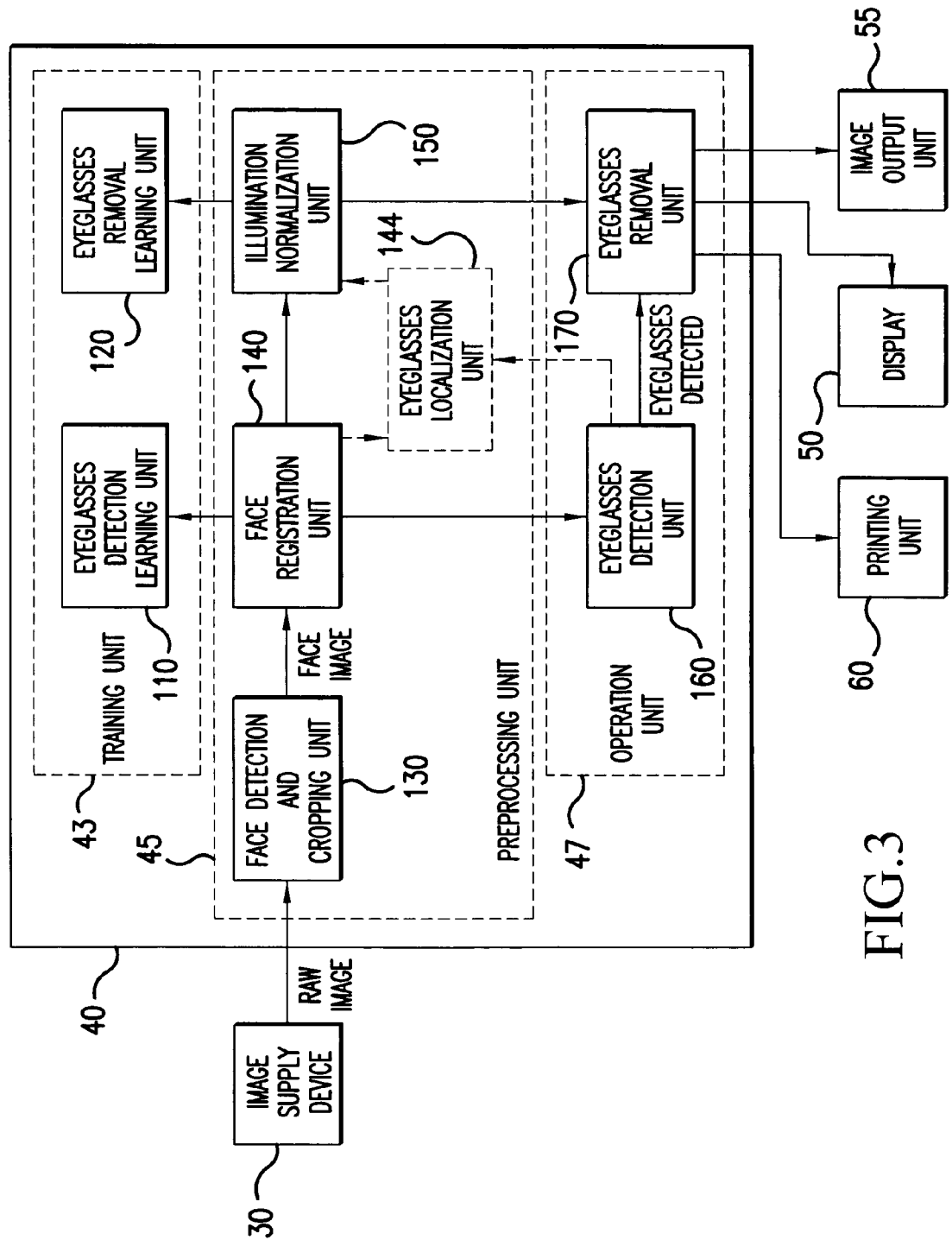
FIG. 3 is a block diagram illustrating in more detail aspects of an image processing unit for automatic eyeglasses detection and removal according to an embodiment of the present invention illustrated in FIG. 2.

FIG. 3 is a block diagram illustrating in more detail aspects of the image processing unit 40 for automatic eyeglasses detection and removal according to an embodiment of the present invention illustrated in FIG. 2. Although the various components of FIG. 3 are illustrated as discrete elements, such an illustration is for ease of explanation and it should be recognized that certain operations of the various components may be performed by the same physical device, e.g., by one or more microprocessors.

Image processing unit 40 for automatic eyeglasses detection and removal includes the following components: a face detection and cropping unit 130; a face registration unit 140; an illumination normalization unit 150; an eyeglasses detection learning unit 110; an eyeglasses removal learning unit 120; an eyeglasses detection unit 160; an eyeglasses removal unit 170; and an optional eyeglasses localization unit 144. Face detection and cropping unit 130, face registration unit 140, illumination normalization unit 150, and optional eyeglasses localization unit 144 are included in preprocessing unit 45. Eyeglasses detection learning unit 110 and eyeglasses removal learning unit 120 are included in training unit 43. Eyeglasses detection unit 160 and eyeglasses removal unit 170 are included in operation unit 47.

Face detection and cropping unit 130 receives digital image data from image supply device 30. Digital image data includes raw images with faces. Face detection and cropping unit 130 detects faces in digital image data, and crops individual face images. Face detection and cropping unit 130 may perform face detection and cropping using methods described in U.S. application Ser. No. 10/734,258 filed on Dec. 15, 2003 and titled "Method and Apparatus for Object Recognition Using Probability Models", which is herein incorporated by reference.

Face registration unit 140 receives face images from face detection and cropping unit 130, and registers the faces. Face registration unit 140 may perform face registration using methods described in the above referenced U.S. application Ser. No. 10/734,258 filed on Dec. 15, 2003 and titled "Method and Apparatus for Object Recognition Using Probability Models", which is herein incorporated by reference. Face registration unit 140 outputs registered face images. Face registration unit 140 provides input to eyeglasses detection learning unit 110, eyeglasses detection unit 160, illumination normalization unit 150, and optional eyeglasses localization unit 144.

During the training stage, training face images are sent to eyeglasses detection learning unit 110 by face registration unit 140. Eyeglasses detection learning unit 110 trains in detecting eyeglasses in face images. Eyeglasses detection learning unit 110 may train in eyeglasses detection using methods described in the cross-referenced related US application titled "Method and Apparatus for Automatic Eyeglasses Detection Using a Nose Ridge Mask", the entire contents of which are hereby incorporated by reference. According to methods described in the above application, training images of faces that may be taken under various illumination conditions are input into eyeglasses detection learning unit 110. The training images have known eyeglasses or no-eyeglasses status. A nose ridge mask extracts pixels located in the nose ridge regions of the training faces in the training images. Linear discriminant analysis is used to find the optimal linear projection basis to discriminate between two classes, i.e., a class of images without eyeglasses and a class of images with eyeglasses. Mean and variances of the two classes are extracted.

During the automatic eyeglasses detection and removal stage, the eyeglasses detection unit 160 receives face images with unknown eyeglasses status from face registration unit 140, and performs automatic eyeglasses detection on the face images. Eyeglasses detection unit 160 may detect eyeglasses using methods described in the cross-referenced related application titled "Method and Apparatus for Automatic Eyeglasses Detection Using a Nose Ridge Mask", the entire contents of which are hereby incorporated by reference. According to methods described in the above application, a score is calculated for each incoming face image. The score is the ratio of the likelihood for the face image to belong to the class of images without eyeglasses, and the likelihood for the face image to belong to the class of images with eyeglasses. The score is compared to a threshold that was determined during the eyeglasses detection training stage. Based on the comparison, a decision about presence or absence of eyeglasses in the face image is output to eyeglasses removal unit 170, and optionally to eyeglasses localization unit 144.

Face registration unit 140 provides input data in the form of face images to illumination normalization unit 150 as well. Illumination normalization unit 150 performs illumination normalization of face images, and provides input to the eyeglasses removal learning unit 120 and eyeglasses removal unit 170. Illumination normalization unit 150 may perform illumination normalization using methods described in the above referenced U.S. application Ser. No. 10/734,258 filed on Dec. 15, 2003 and titled "Method and Apparatus for Object Recognition Using Probability Models", which is herein incorporated by reference. Details of the operation of illumination normalization unit 150 are described with reference to FIGS. 5A-5B.

During the training stage, training face images are sent to eyeglasses removal learning unit 120 by illumination normalization unit 150. Eyeglasses removal learning unit 120 trains in removing eyeglasses from face images. Eyeglasses removal learning unit 120 may train in eyeglasses removal using methods described in C. Wu et al, *Automatic Eyeglasses Removal from Face Images*, IEEE Transactions on Pattern Analysis and Machine Intelligence, Vol. 26, No. 3, March 2004, which is hereby incorporated by reference. According to methods described in the above publication, principal component analysis and maximum a posteriori estimation are used to model the joint distribution of training face images with and without eyeglasses, in an eigenspace spanned by all training face images. A projection matrix that describes a transformation between face areas around eyes with eyeglasses and face areas around eyes without eyeglasses is extracted. Details of the eyeglasses removal training process are described with reference to FIG. 6A.

During the automatic eyeglasses detection and removal stage, the eyeglasses removal unit 170 receives face images with eyeglasses and performs automatic eyeglasses removal and reconstruction of face images. Images with eyeglasses reach eyeglasses removal unit 170 from face registration unit 140 via illumination normalization unit 150. If eyeglasses localization unit 144 is present, it may localize eyeglasses in images with eyeglasses and send images with localized eyeglasses to illumination normalization unit 150. Illumination normalization unit 150 then sends images with localized eyeglasses to eyeglasses removal unit 170. Optional eyeglasses localization unit 144 may localize eyeglasses in face images using methods described in the above referenced publication by C. Wu et al, titled *Automatic Eyeglasses Removal from Face Images*, which is herein incorporated by reference. Eyeglasses removal unit 170 may remove eyeglasses and reconstruct eyeglasses-free face regions using methods described in the same referenced publication by C. Wu et al, titled *Automatic Eyeglasses Removal from Face Images*, which is herein incorporated by reference. According to methods described in *Automatic Eyeglasses Removal from Face Images* by C. Wu et al, an eyeglasses-free image is estimated from an eyeglasses image using the projection matrix derived during the eyeglasses removal training stage. Details of the eyeglasses removal process are described with reference to FIG. 6B. Eyeglasses removal unit 170 outputs face images without eyeglasses. The face images without eyeglasses may be output to display 50, image output unit 55, and/or printing unit 60.

Face detection and cropping unit 130, face registration unit 140, illumination normalization unit 150, eyeglasses detection learning unit 110, eyeglasses removal learning unit 120, eyeglasses detection unit 160, eyeglasses removal unit 170, and optional eyeglasses localization unit 144 are software applications.

Figure 4A:
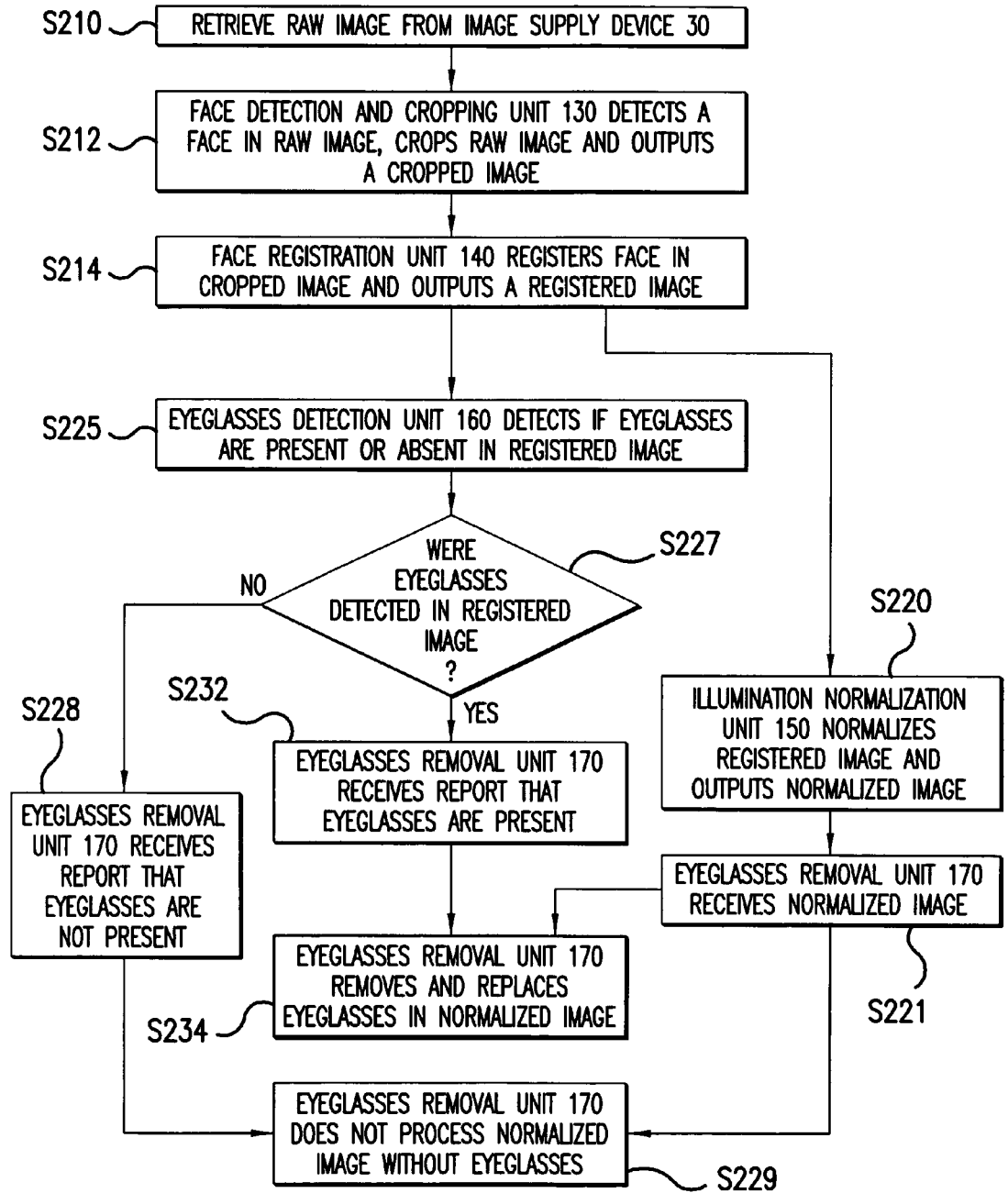
FIG. 4A is a flow diagram illustrating operations performed by an image processing unit for automatic eyeglasses detection and removal according to an embodiment of the present invention illustrated in FIG. 3.

FIG. 4A is a flow diagram illustrating operations performed by an image processing unit 40 for automatic eyeglasses detection and removal according to an embodiment of the present invention illustrated in FIG. 3. FIG. 4A illustrates operations performed during the automatic eyeglasses detection and removal stage of image processing unit 40. During this stage, eyeglasses are automatically detected and removed from face images, and the eyeglasses face areas are replaced with face areas without eyeglasses.

Face detection and cropping unit 130 receives from image supply device 30 a raw image that includes people (S210). Face detection and cropping unit 130 detects a face in the raw image, and crops an image with the face (S212). Face registration unit 140 receives the cropped face image, performs face registration, and outputs a registered image (S214). Both eyeglasses detection unit 160 and illumination normalization unit 150 receive the registered image from face registration unit 140. Illumination normalization 150 normalizes the registered image and outputs a normalized image (S220). The normalized image is sent to eyeglasses removal unit 170 (S221).

Eyeglasses detection unit 160, which has also received the registered image from face registration unit 140, detects if eyeglasses are present or absent in the registered image (S225). A test is then performed to determine whether eyeglasses were detected (S227). If no eyeglasses were detected, eyeglasses removal unit 170 receives a report that eyeglasses are not present in the face image (S228). Consequently, eyeglasses removal unit 170 does not process the normalized image corresponding to the registered image, received from illumination normalization unit 150 (S229).

If eyeglasses were detected in the registered image, eyeglasses removal unit 170 receives a report that eyeglasses are present in the face image (S232). Eyeglasses removal unit 170 then removes the eyeglasses from the normalized image corresponding to the registered image, received from illumination normalization unit 150 (S234). While removing the eyeglasses, eyeglasses removal unit 170 replaces the eyeglasses area of the face with an eyeglasses-free area.

Figure 4B:
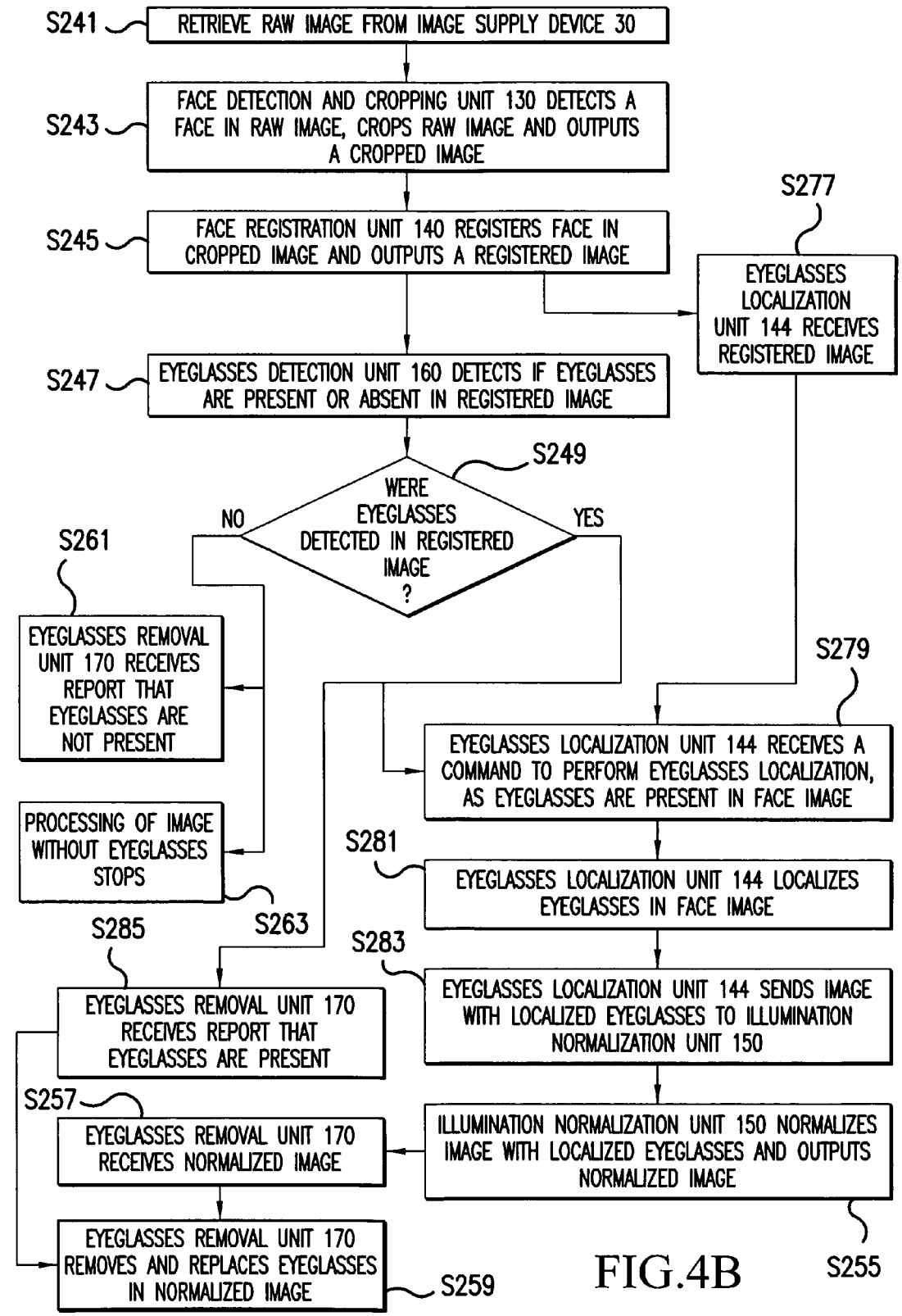
FIG. 4B is an alternative flow diagram illustrating operations performed by an image processing unit for automatic eyeglasses detection and removal according to an embodiment of the present invention illustrated in FIG. 3.

FIG. 4B is an alternative flow diagram illustrating operations performed by an image processing unit 40 for automatic eyeglasses detection and removal according to an embodiment of the present invention illustrated in FIG. 3. FIG. 4B illustrates alternative operations performed during the automatic eyeglasses detection and removal stage of image processing unit 40. In FIG. 4B, eyeglasses localization unit 144 performs eyeglasses localization. Hence, face images received by eyeglasses removal unit 170 contain eyeglasses that have been localized. Eyeglasses are then automatically removed from face images by eyeglasses removal unit 170. Eyeglasses face areas are then replaced with areas without eyeglasses.

Face detection and cropping unit 130 receives from image supply device 30 a raw image that includes people (S241). Face detection and cropping unit 130 detects a face in the raw image and crops an image with the face (S243). Face registration unit 140 receives the cropped face image, performs face registration, and outputs a registered image (S245). Eyeglasses localization unit 144 receives the registered image (S277). Eyeglasses detection unit 160 also receives the registered image from face registration unit 140, and detects if eyeglasses are present or absent in the registered image (S247). A test is then performed to determine whether eyeglasses were detected (S249). If no eyeglasses were detected, eyeglasses removal unit 170 receives a report that eyeglasses are not present in the face image (S261). No further processing of the face image without eyeglasses is done (S263).

If eyeglasses were detected in the registered image, eyeglasses removal unit 170 receives a report that eyeglasses are present in the face image (S285), and eyeglasses localization unit 144 receives a command to perform eyeglasses localization, as eyeglasses are present in the face image (S279). Eyeglasses localization unit 144 localizes eyeglasses in the face image (S281) and then sends the image with localized eyeglasses to illumination normalization unit 150 (S283). Illumination normalization unit 150 normalizes the image with localized eyeglasses and outputs a normalized image (S255). The normalized image with localized eyeglasses is sent to eyeglasses removal unit 170 (S257). Eyeglasses removal unit 170 then removes the eyeglasses from the normalized image received from illumination normalization unit 150 (S259). During the eyeglasses removal process, eyeglasses removal unit 170 replaces the eyeglasses area of the face with an eyeglasses-free area and outputs a face image without eyeglasses.

Figure 5A:
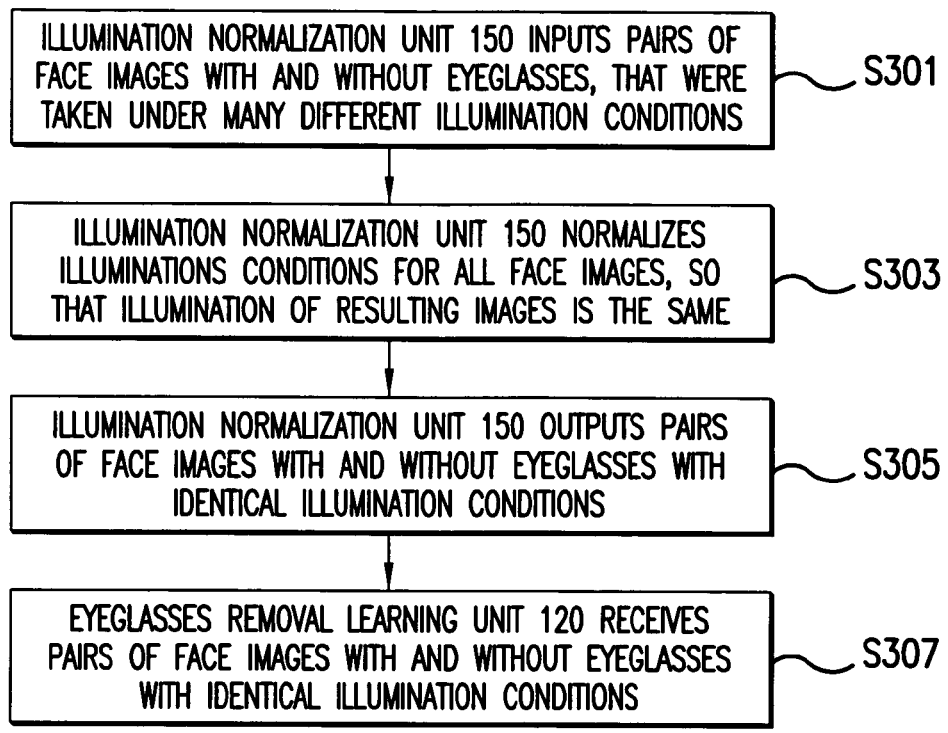
FIG. 5A is a flow diagram illustrating operations performed during the training stage by an illumination normalization unit included in an image processing unit for automatic eyeglasses detection and removal according to an embodiment of the present invention illustrated in FIG. 3.

FIG. 5A is a flow diagram illustrating operations performed during the training stage by an illumination normalization unit 150 included in an image processing unit 40 for automatic eyeglasses detection and removal according to an embodiment of the present invention illustrated in FIG. 3. Illumination normalization unit 150 may use a histogram-based normalization procedure for images taken under various illumination conditions.

During the training stage, illumination normalization unit 150 receives from face registration unit 140 pairs of face images for the same person with and without eyeglasses. The face images were taken under many different illumination conditions (S301). Illumination conditions include different directions of light, different light intensities, etc. A large number of illumination conditions may be used for training images. In one implementation, 50 different illumination conditions were used on training images. 50 illumination conditions can be obtained as a result of the combination of a few factors. For example, 10 possible directions of light can be combined with 5 possible light intensities, to obtain 5×10=50 different illumination conditions. More than 50 illumination conditions may also be used.

Sets of training images with and without eyeglasses are shown below, where the same ID value refers to the same person. Every set of 2 images contains an image with eyeglasses and an image without eyeglasses for the same person. The sets of training images listed below include: two images of a first person with and without eyeglasses, taken under illumination condition A; two more images of the first person with and without eyeglasses, taken under illumination condition B; two images of a second person with and without eyeglasses taken under illumination condition C; and two more images of the second person with and without eyeglasses, taken under illumination condition D.

$$\begin{bmatrix} ID = 0; \text{IlluminationCondition} = A \\ ID = 0; \text{IlluminationCondition} = A \end{bmatrix}$$

$$\begin{bmatrix} ID = 0; \text{IlluminationCondition} = B \\ ID = 0; \text{IlluminationCondition} = B \end{bmatrix}$$

...

$$\begin{bmatrix} ID = 1; \text{IlluminationCondition} = C \\ ID = 1; \text{IlluminationCondition} = C \end{bmatrix}$$

$$\begin{bmatrix} ID = 1; \text{IlluminationCondition} = D \\ ID = 1; \text{IlluminationCondition} = D \end{bmatrix}$$

...

Illumination normalization unit 150 normalizes illuminations conditions for all training face images, so that the illumination conditions, denoted by "I", of the resulting face images are the same (S303), as shown below:

$$\begin{bmatrix} ID = 0; \text{IlluminationCondition} \sim I \\ ID = 0; \text{IlluminationCondition} \sim I \end{bmatrix}$$

$$\begin{bmatrix} ID = 0; \text{IlluminationCondition} \sim I \\ ID = 0; \text{IlluminationCondition} \sim I \end{bmatrix}$$

...

$$\begin{bmatrix} ID = 1; \text{IlluminationCondition} \sim I \\ ID = 1; \text{IlluminationCondition} \sim I \end{bmatrix}$$

$$\begin{bmatrix} ID = 1; \text{IlluminationCondition} \sim I \\ ID = 1; \text{IlluminationCondition} \sim I \end{bmatrix}$$

Illumination normalization unit 150 then outputs the pairs of training face images with and without eyeglasses, with identical illumination conditions (S305). Eyeglasses removal learning unit 120 receives the training pairs of face images with and without eyeglasses with identical illumination conditions (S307), and uses them for training in eyeglasses removal.

Figure 5B:
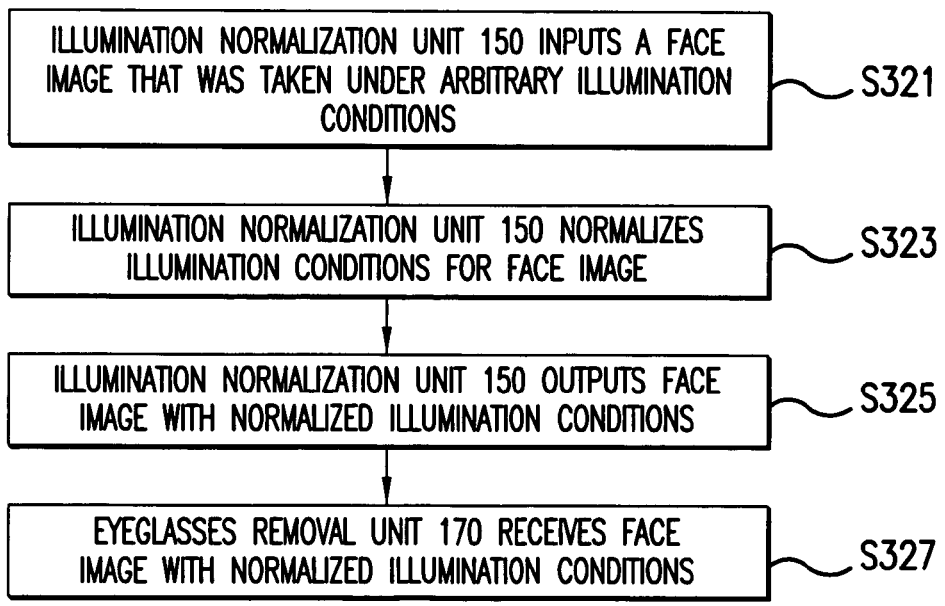
FIG. 5B is a flow diagram illustrating operations performed during the automatic eyeglasses detection and removal stage by an illumination normalization unit included in an image processing unit for automatic eyeglasses detection and removal according to an embodiment of the present invention illustrated in FIG. 3.

FIG. 5B is a flow diagram illustrating operations performed during the automatic eyeglasses detection and removal stage by an illumination normalization unit 150 included in an image processing unit 40 for automatic eyeglasses detection and removal according to an embodiment of the present invention illustrated in FIG. 3. During the automatic eyeglasses detection and removal stage, illumination normalization unit 150 receives from face registration unit 140 a face image (S321). The image was taken under arbitrary illumination conditions, as shown below:

ID=2; Illumination Condition=A, or B, or C, or D, or E, etc.

Illumination normalization unit 150 normalizes the illumination conditions for the face image to the common illumination conditions "I" used in the training stage (S323).

ID=2; Illumination Condition~I.

Illumination normalization unit 150 outputs a face image with normalized illumination conditions (S325). Eyeglasses removal unit 170 receives the face image with normalized illumination conditions (S327), and automatically removes eyeglasses from the face image.

Figure 6A:
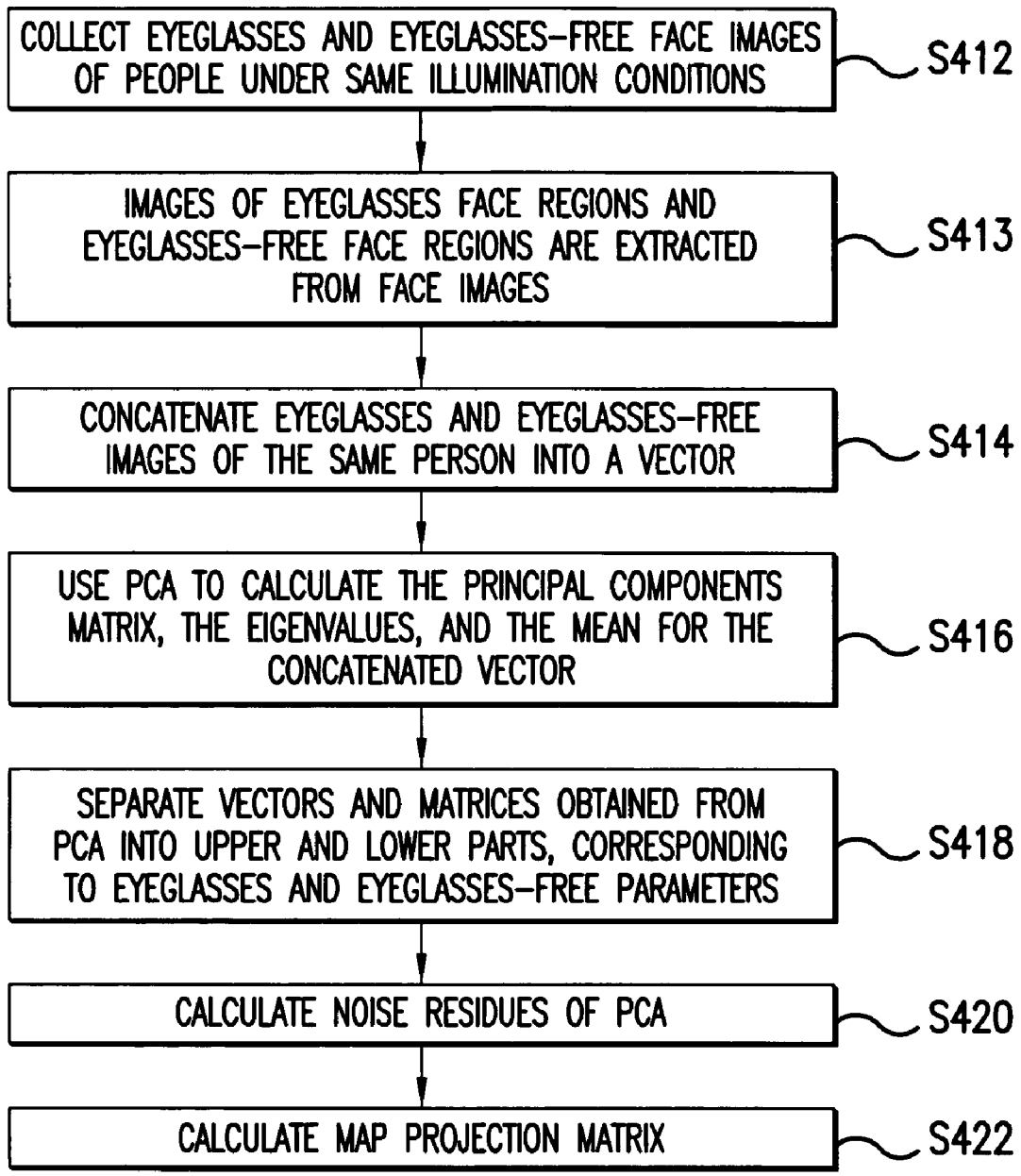
FIG. 6A is a flow diagram illustrating operations performed during the training stage by an eyeglasses removal learning unit included in an image processing unit for automatic eyeglasses detection and removal according to an embodiment of the present invention illustrated in FIG. 3.

FIG. 6A is a flow diagram illustrating operations performed during the training stage by an eyeglasses removal learning unit 120 included in an image processing unit 40 for automatic eyeglasses detection and removal according to an embodiment of the present invention illustrated in FIG. 3. Training for eyeglasses removal and replacement is performed using a maximum a posteriori (MAP)-based method, using methods described in C. Wu et al, *Automatic Eyeglasses Removal from Face Images*, IEEE Transactions on Pattern Analysis and Machine Intelligence, Vol. 26, No. 3, pp. 322-335, March 2004, which is hereby incorporated by reference. Pairs of training face images of people, with and without eyeglasses, are used for eyeglasses removal training. A pair of training images contains two images of the same person, one image with eyeglasses and the other image without eyeglasses, taken in identical environmental conditions. Identical environmental conditions can be achieved for a pair of images if, for example, pictures of the same person are taken seconds apart.

Eyes and eyeglasses are localized in the training images, and eyeglasses face regions and eyeglasses-free face regions are extracted from the training face images. The eyeglasses face regions are rectangular areas that include the eyeglasses. The eyeglasses-free face regions are rectangular areas that include the eyes.

The training eyeglasses face regions are denoted $I_G$, and the training eyeglasses-free face regions are denoted $I_F$. A MAP-based method is used to create a probability model as an estimate for the conditional probability $p(I_F, I_G)$. Based on the MAP criterion, $I_F$ can be inferred from $I_G$ by $$\hat{I}_F = \arg\max_{I_F} p(I_F | I_G) \quad (1)$$

$$= \arg\max_{I_F} p(I_G | I_F) p(I_F) \quad (2)$$

$$= \arg\max_{I_F} p(I_G, I_F) \quad (3)$$

The joint distribution $P(I_F, I_G)$ is estimated by introducing a hidden variable V such that $$p(I_F, I_G) = \int p(I_F, I_G | V) p(V) dV \quad (4)$$
$$= \int p(I_F | V) p(I_G | V) p(V) dV$$

The hidden variable V is set as the principal components of $I_F$ and $I_G$.

Four sub-stages are present in eyeglasses removal training: (1) paired data generation; (2) Principal Component Analysis; (3) calculation of powers of noise; and (4) calculation of a MAP projection matrix.

During the first sub-stage, namely the sub-stage of paired data generation, training face images of people with and without eyeglasses and under the same illumination conditions, are retrieved from illumination normalization unit 150 (S412). Images of eyeglasses regions and eyeglasses-free regions around the eyes are extracted from the training face images (S413). The eyeglasses and eyeglasses-free images are concatenated into a vector (S414)

$$Y^T = [I_G^T I_F^T] \quad (5)$$

where Y is the concatenated vector. The training set is then expressed as $$\{Y(i), i=1, \ldots, M\} \quad (6)$$

where M is the number of training samples.

During the second sub-stage, principal component analysis (PCA) is used with the training set $\{Y(i), i=1, \ldots, M\}$. PCA decomposition is based on an additive model in which an image with eyeglasses is the sum of a face component $I_f$, a glasses component $I_g$, and noise component n:

$$I_r = I_f + I_g + n \quad (7)$$

PCA calculates the principal components matrix $\Psi = [\Psi_1 \Psi_2 \ldots \Psi_h]$, the eigenvalues $\{\sigma_i^2, i=1, \ldots, h\}$, and the mean $\mu_Y$, where h is the number of principal components of the training set $\{Y(i), i=1, \ldots, M\}$ (S416). The hidden variable V is the set of principal component coefficients, so that:

$$Y = \Psi V + \mu_Y + \epsilon_Y \quad (8)$$

where $V = \Psi^T(Y - \mu_Y)$, $V \sim N(0, \Lambda_V)$, and $\epsilon_Y$ is a Gaussian noise.

All vectors and matrices obtained from PCA can be divided into upper and lower parts, corresponding to eyeglasses and eyeglasses-free parameters respectively (S418), as shown in equations (9):

$$\Psi = \begin{bmatrix} \Psi_G \\ \Psi_F \end{bmatrix}, \quad \mu_Y = \begin{bmatrix} \mu_G \\ \mu_F \end{bmatrix}, \quad \varepsilon_Y = \begin{bmatrix} \varepsilon_G \\ \varepsilon_F \end{bmatrix} \quad (9)$$

In the third sub-stage, the sub-stage of calculation of powers of noise, noise residues of PCA are calculated (S420), using equations (10) and (11):

$$\epsilon_G = I_G - (\Psi_G V + \mu_G) \quad (10)$$

$$\epsilon_F = I_F - (\Psi_F V + \mu_F) \quad (11)$$

The noise terms are modeled as:

$$\epsilon_G \sim N(0, \sigma_G^2 I) \quad (12)$$

and $$\epsilon_F \sim N(0, \sigma_F^2 I) \quad (13)$$

where $\sigma_G^2$ and $\sigma_F^2$ are the noise powers. The estimates of the powers of noise are the mean square of the observed noise values.

In the fourth sub-stage a MAP projection matrix is calculated (S422). The MAP projection matrix provides a relationship between eyeglasses-free face regions and face regions with eyeglasses. The MAP projection matrix is calculated by finding $$\hat{V}^* = \arg\max_V p(I_G | V) p(V) \qquad (14)$$

Relationship (14) is derived using equations (3) and (4). Equation (14) is equivalent to $$\hat{V}^* = \arg\min_V \{\sigma_G^2 V^T \Lambda_V^{-1} V + (\Psi_G V + \mu_G - I_G)^T (\Psi_G V + \mu_G - I_G)\} \qquad (15)$$

A closed-form solution that minimizes the right term in equation (15) is:

$$\hat{V}^* \approx (\Psi_G^T \Psi_G + \sigma_G^2 \Lambda_V^{-1})^{-1} \Psi_G^T (I_G - \mu_G), \qquad (16)$$

The projection matrix ($W_{MAP}$) is given by:

$$W_{MAP} = \Psi_F (\Psi_G^T \Psi_G + \sigma_G^2 \Lambda_V^{-1})^{-1} \Psi_G^T \qquad (17)$$

where $$\Lambda_V = \mathrm{diag}\{\sigma_1^2, \ldots, \sigma_h^2\}. \qquad (18)$$

Figure 6B:
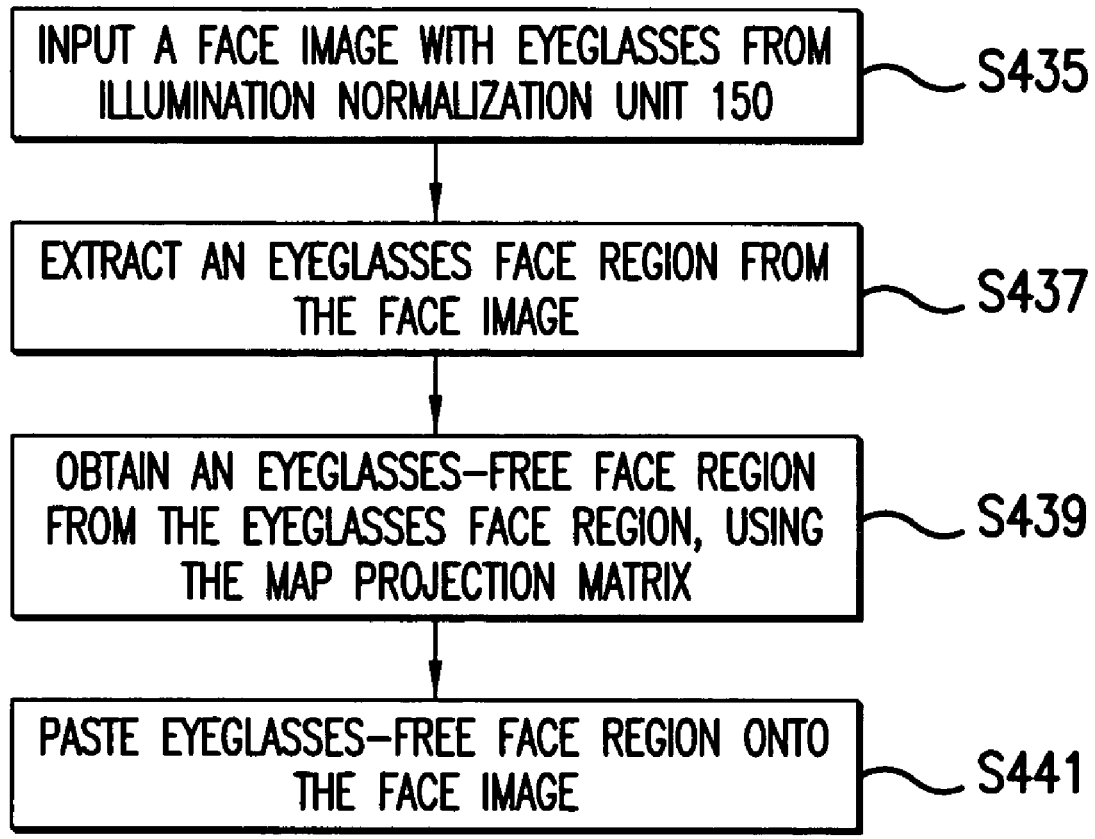
FIG. 6B is a flow diagram illustrating operations performed during the automatic eyeglasses detection and removal stage by an eyeglasses removal unit included in an image processing unit for automatic eyeglasses detection and removal according to an embodiment of the present invention illustrated in FIG. 3.

FIG. 6B is a flow diagram illustrating operations performed during the automatic eyeglasses detection and removal stage by an eyeglasses removal unit 170 included in an image processing unit 40 for automatic eyeglasses detection and removal according to an embodiment of the present invention illustrated in FIG. 3. During the automatic eyeglasses detection and removal stage, eyeglasses removal unit 170 receives from illumination normalization unit 150 a face image with eyeglasses (S435). An image of the eyeglasses face region $I_G$ located around the eyes is extracted from the face image (S437). Optionally, eyeglasses are also localized in the face image. The image of the eyeglasses face region $I_G$ is a rectangular area around the eyes that includes the eyeglasses. An eyeglasses-free face region $\hat{I}_F$ is estimated from the eyeglasses face region $I_G$ using the MAP projection matrix $W_{MAP}$ derived in the training stage (S439):

$$\hat{I}_F = W_{MAP}(I_G - \mu_G) + \mu_F \qquad (19)$$

where $\mu_G$ and $\mu_F$ are the eyeglasses and eyeglasses-free components of the training set mean obtained during the training stage. Finally, the eyeglasses-free face region $\hat{I}_F$ is pasted onto the face image (S441).

Figure 7:
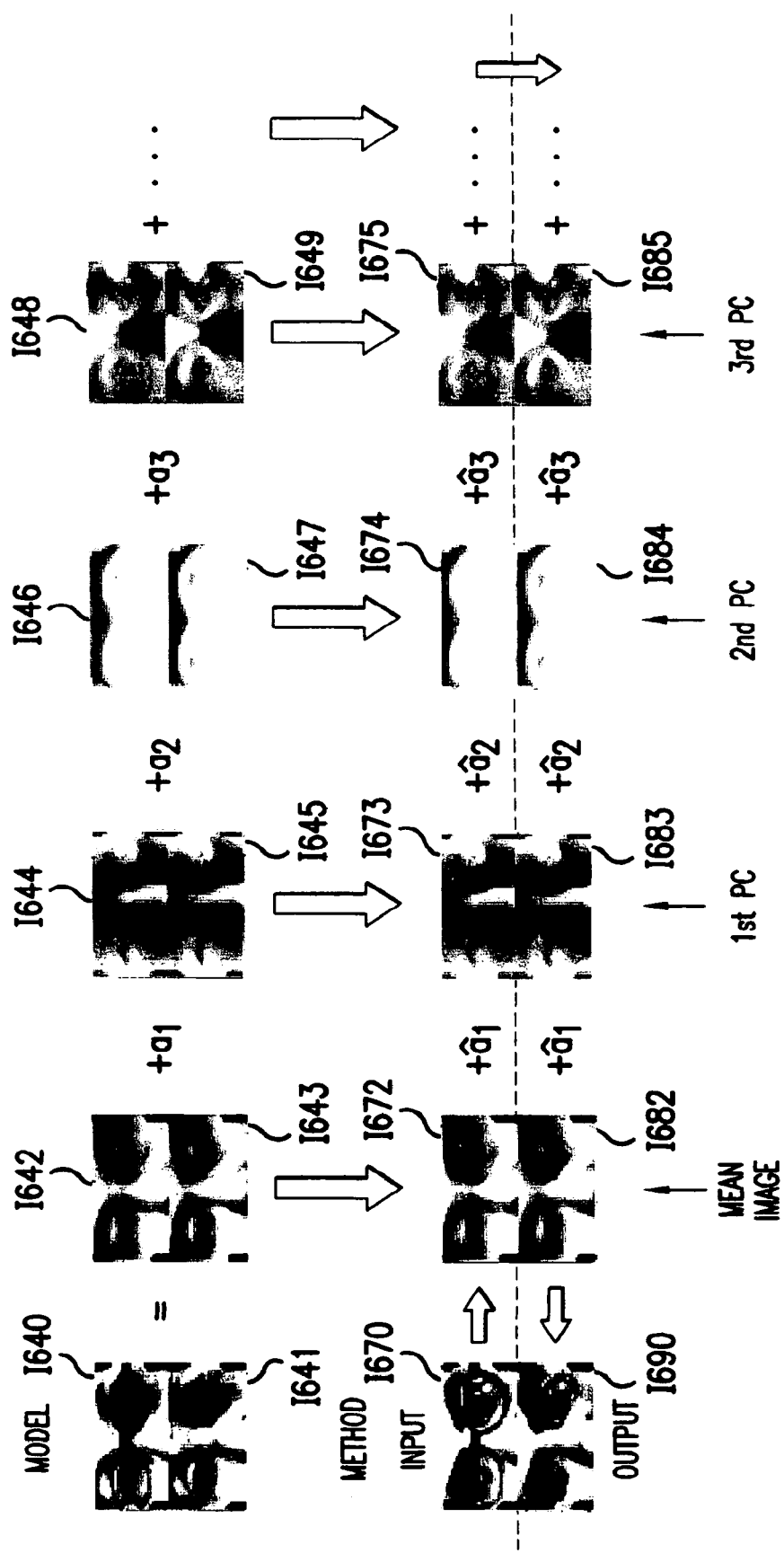
FIG. 7 illustrates an intuitive explanation for a maximum a posteriori method used in the eyeglasses removal training stage and in the automatic eyeglasses detection and removal stage as illustrated in FIGS. 6A-6B.

FIG. 7 illustrates an intuitive explanation for a maximum a posteriori method used in the eyeglasses removal training stage and in the automatic eyeglasses detection and removal stage as illustrated in FIGS. 6A-6B. During the training stage, eyeglasses face region image I640 and eye region image I641 of the same person with and without eyeglasses are analyzed in eyeglasses removal learning unit 120, by extracting mean images I642 and I643, the first principal component (PC) images I644 and I645, the second principal component images I646 and I647, and the third principal component images I648 and I649. Additional components can be extracted for increased accuracy.

During the automatic eyeglasses detection and removal stage, eyeglasses removal unit 170 receives a face image in which eyeglasses were detected. Eyeglasses removal unit 170 extracts an eyeglasses face region I670 for the face image. The mean image I672 as well as the first, second and third principal component images I673, I674 and I675 are extracted from the eyeglasses face region I670. Additional components can be extracted for increased accuracy. Using a MAP projection matrix, a mean image I682 as well as the first, second and third principal component images I683, I684 and I685 are generated, for the corresponding eye region without eyeglasses. By adding up images I682, I683, I684 and I685 multiplied by their respective eigenvalues, which are the same as the eigenvalues of eyeglasses image I670, the output image I690 is obtained. Output image I690 shows the same face region as the face region in input image I670, but without eyeglasses.

Figure 8:
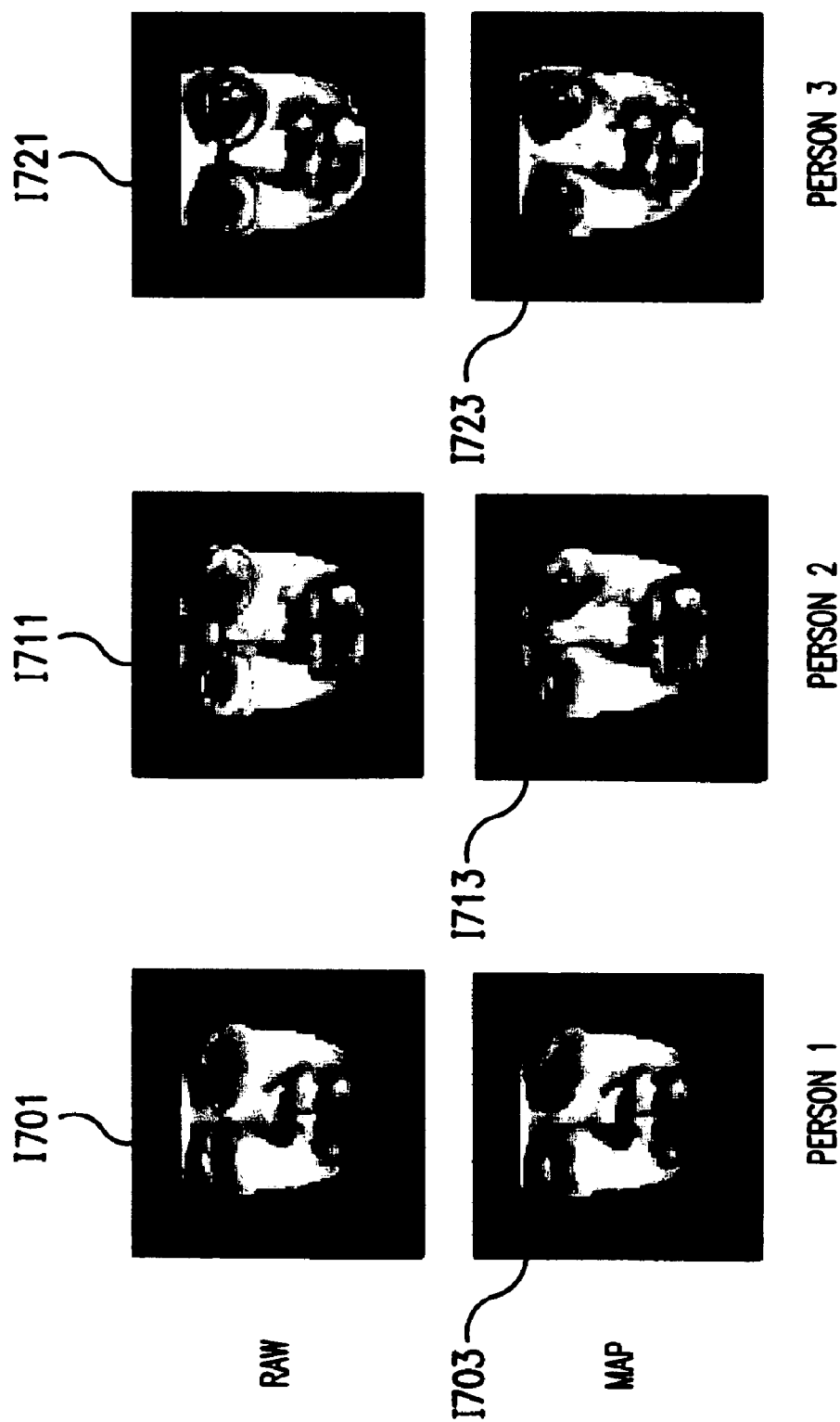
FIG. 8 illustrates exemplary outputs of an image processing unit for automatic eyeglasses detection and removal according to an embodiment of the present invention illustrated in FIG. 3.

FIG. 8 illustrates exemplary outputs of an image processing unit 40 for automatic eyeglasses detection and removal according to an embodiment of the present invention illustrated in FIG. 3. Raw face images I701, I711 and I721 of three different persons wearing eyeglasses are shown. Face images output by image processing unit 40 after eyeglasses removal and replacement are shown in the second row. The faces I703, I713, and I723 in the second row do not contain eyeglasses.

Figure 9A:
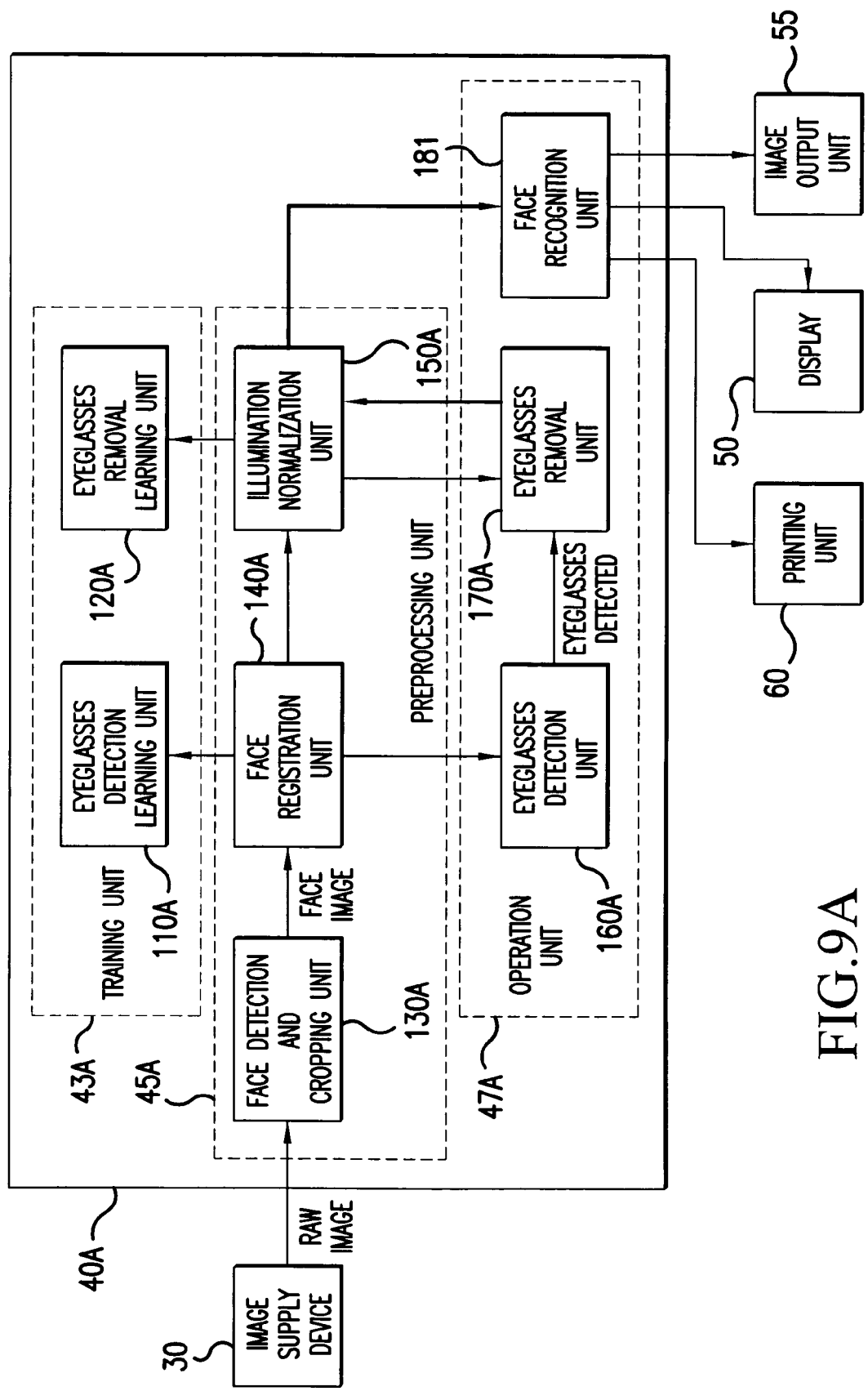
FIG. 9A is a block diagram of an image processing unit for face recognition included in the system illustrated in FIG. 1 according to a second embodiment of the present invention.

FIG. 9A is a block diagram of an image processing unit 40A for face recognition included in the system illustrated in FIG. 1 according to a second embodiment of the present invention. The image processing unit 40A illustrated in FIG. 9A uses two illumination normalizations to perform face recognition including face classification. As shown in FIG. 9A, the image processing unit 40A includes the following elements: a face detection and cropping unit 130A; a face registration unit 140A; an illumination normalization unit 150A; an eyeglasses detection learning unit 110A; an eyeglasses removal learning unit 120A; an eyeglasses detection unit 160A; an eyeglasses removal unit 170A; and a face recognition unit 181. Face detection and cropping unit 130A, face registration unit 140A and illumination normalization unit 150A are included in preprocessing unit 45A. Eyeglasses detection learning unit 110A and eyeglasses removal learning unit 120A are included in training unit 43A. Eyeglasses detection unit 160A, eyeglasses removal unit 170A and face recognition unit 181 are included in operation unit 47A.

In accordance with this second embodiment of the present invention, the face detection and cropping unit 130A, the face registration unit 140A, the illumination normalization unit 150A, the eyeglasses detection learning unit 110A, the eyeglasses removal learning unit 120A, the eyeglasses detection unit 160A, and the eyeglasses removal unit 170A may function in like manner to the corresponding elements of the first embodiment.

In accordance with the second embodiment illustrated in FIG. 9A, face recognition unit 181 performs face classification of face images. Face images with and without eyeglasses are input into face detection and cropping unit 130A. Operations similar to the steps described in the flow diagram of FIG. 4A are performed to automatically detect and remove eyeglasses from the face images. Face images without eyeglasses are output by eyeglasses removal unit 170A. The face images without eyeglasses are sent back to illumination normalization unit 150A. Illumination normalization unit 150A performs a $2^{nd}$ illumination normalization for the images without eyeglasses received from eyeglasses removal unit 170A. The second illumination normalization is performed to eliminate artifacts created during eyeglasses removal. The second illumination normalization uses the same algorithms as the first illumination normalization. After the $2^{nd}$ illumination normalization, illumination normalization unit 150A sends normalized images to face recognition unit 181. Face recognition unit 181 classifies the images without eyeglasses into various identities. Such classification results as well as face images may be output to printing unit 60, display 50, and/or image output unit 55.

Figure 9B:
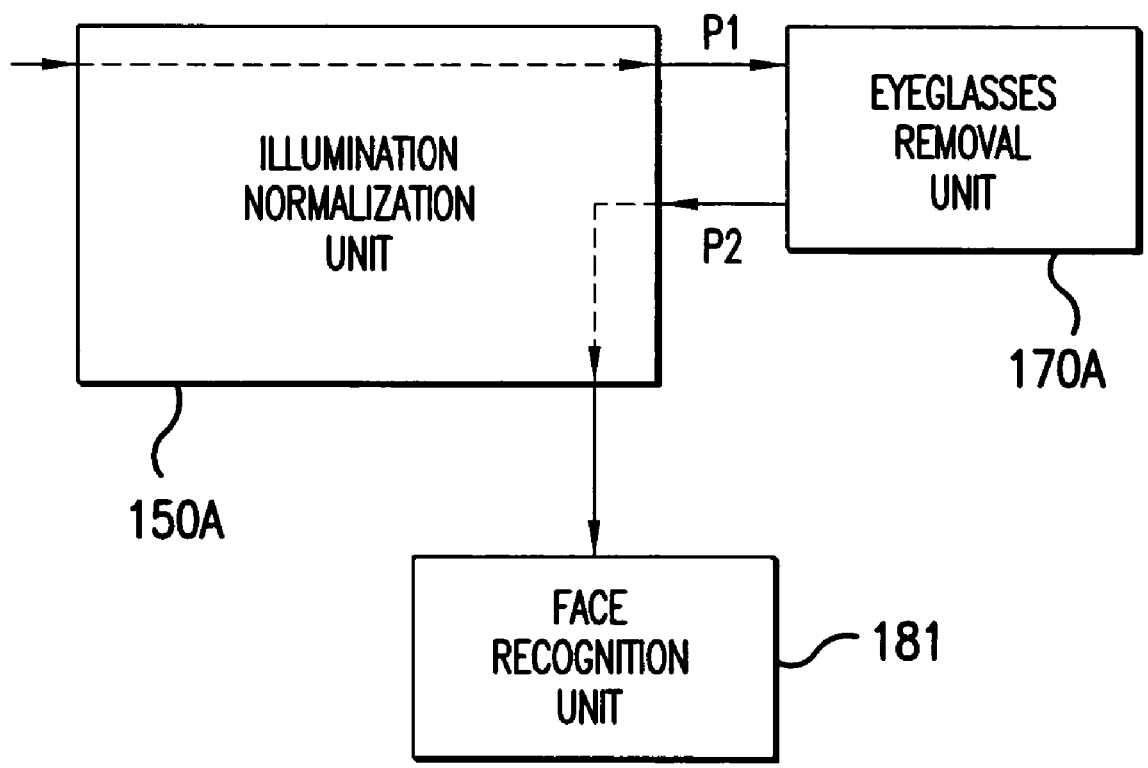
FIG. 9B is a block diagram illustrating in more detail aspects of an image processing unit for face recognition according to a second embodiment of the present invention illustrated in FIG. 9A.

FIG. 9B is a block diagram illustrating in more detail aspects of an image processing unit 40A for face recognition according to an embodiment of the present invention illustrated in FIG. 9A. FIG. 9B illustrates the illumination normalization unit 150A together with the units for which it provides image data during automatic eyeglasses detection and removal. Image data passes through illumination normalization unit 150A, to eyeglasses removal unit 170A (on path P1), then back to illumination normalization unit 150A (on path P2), and next to face recognition unit 181.

Figure 10A:
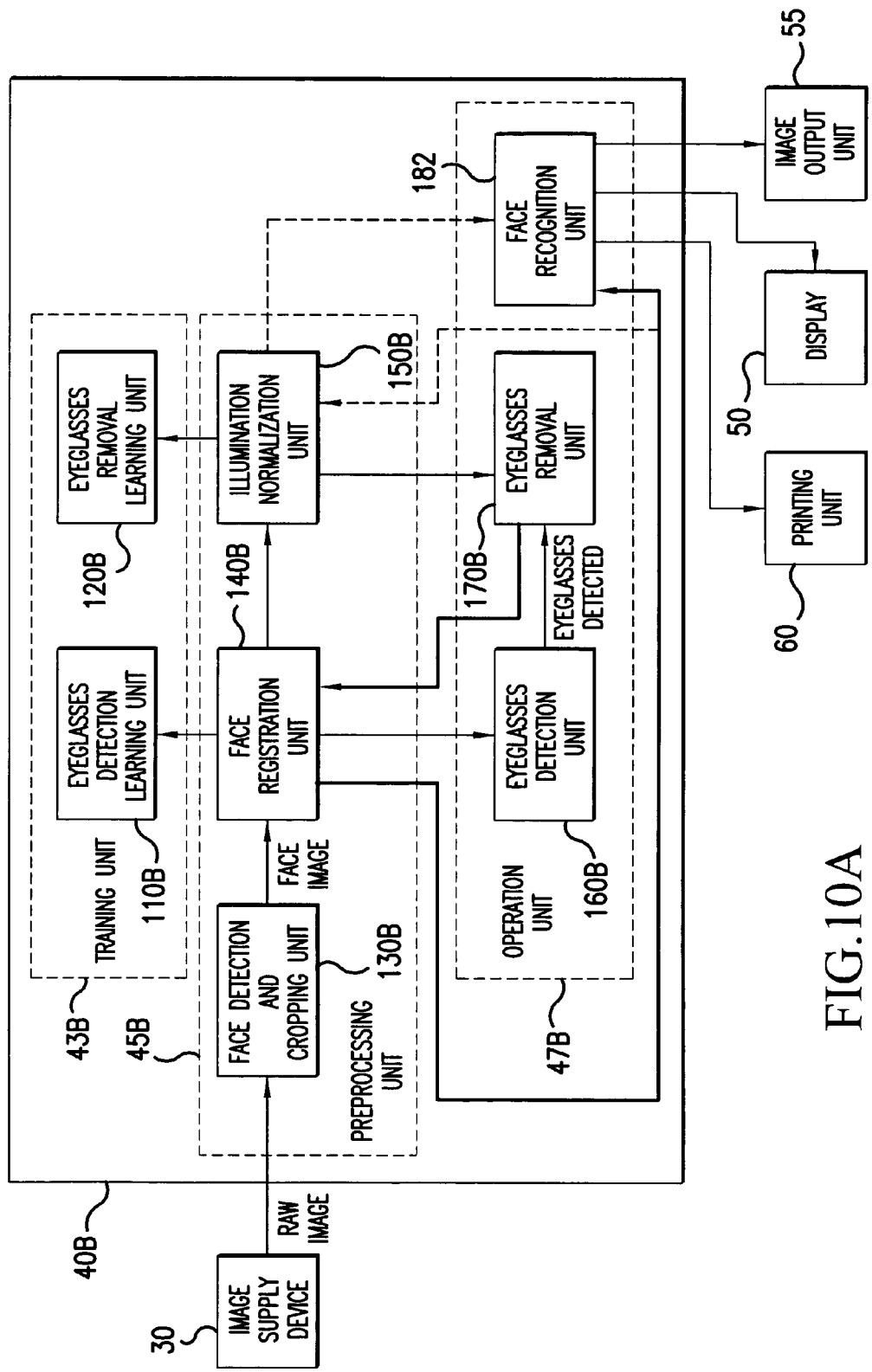
FIG. 10A is a block diagram of an image processing unit for face recognition included in the system illustrated in FIG. 1 according to a third embodiment of the present invention.

FIG. 10A is a block diagram of an image processing unit 40B for face recognition included in the system illustrated in FIG. 1 according to a third embodiment of the present invention. The image processing unit 40B illustrated in FIG. 10A uses two face registrations to perform face classification. As shown in FIG. 10A, the image processing unit 40B includes the following elements: a face detection and cropping unit 130B; a face registration unit 140B; an illumination normalization unit 150B; an eyeglasses detection learning unit 110B; an eyeglasses removal learning unit 120B; an eyeglasses detection unit 160B; an eyeglasses removal unit 170B; and a face recognition unit 182. Face detection and cropping unit 130B, face registration unit 146B and illumination normalization unit 150B are included in preprocessing unit 45B. Eyeglasses detection learning unit 110B and eyeglasses removal learning unit 120B are included in training unit 43B. Eyeglasses detection unit 160B, eyeglasses removal unit 170B and face recognition unit 182 are included in operation unit 47B.

In accordance with this third embodiment of the present invention, the face detection and cropping unit 130B, the face registration unit 140B, the illumination normalization unit 150B, the eyeglasses detection learning unit 110B, the eyeglasses removal learning unit 120B, the eyeglasses detection unit 160B, and the eyeglasses removal unit 170B may function in like manner to the corresponding elements of the first embodiment.

In accordance with the third embodiment illustrated in FIG. 10A, face recognition unit 182 performs face classification of face images. Face images with and without eyeglasses are input into face detection and cropping unit 130B. Operations similar to the steps described in the flow diagram of FIG. 4A are performed to automatically detect and remove eyeglasses from the face images. A face registration step similar to step S214 improves eyeglasses detection and removal, and is performed using eye-related features. Face images without eyeglasses are output by eyeglasses removal unit 170B.

The face images without eyeglasses are sent back to face registration unit 140B. Face registration unit 140 performs a $2^{nd}$ face registration for the images without eyeglasses received from eyeglasses removal unit 170B. The $2^{nd}$ face registration is based on the same algorithms as the first face registration, but uses all face features available, not just eye-related features. After the $2^{nd}$ face registration, face registration unit 140B sends face images without eyeglasses to face recognition unit 182. Face recognition unit 182 classifies the images without eyeglasses into various identities. Such classification results may be output to printing unit 60, display 50, and/or image output unit 55.

Optionally, a second illumination normalization can be performed after the $2^{nd}$ face registration. In this case, face registration unit 140B sends face images to illumination normalization unit 150B after the $2^{nd}$ face registration. Illumination normalization unit 150B performs a second illumination normalization of the face images and sends the resulting face images to face recognition unit 182. Face recognition unit 182 then classifies the images without eyeglasses into various identities. Such classification results may be output to printing unit 60, display 50, and/or image output unit 55.

Figure 10B:
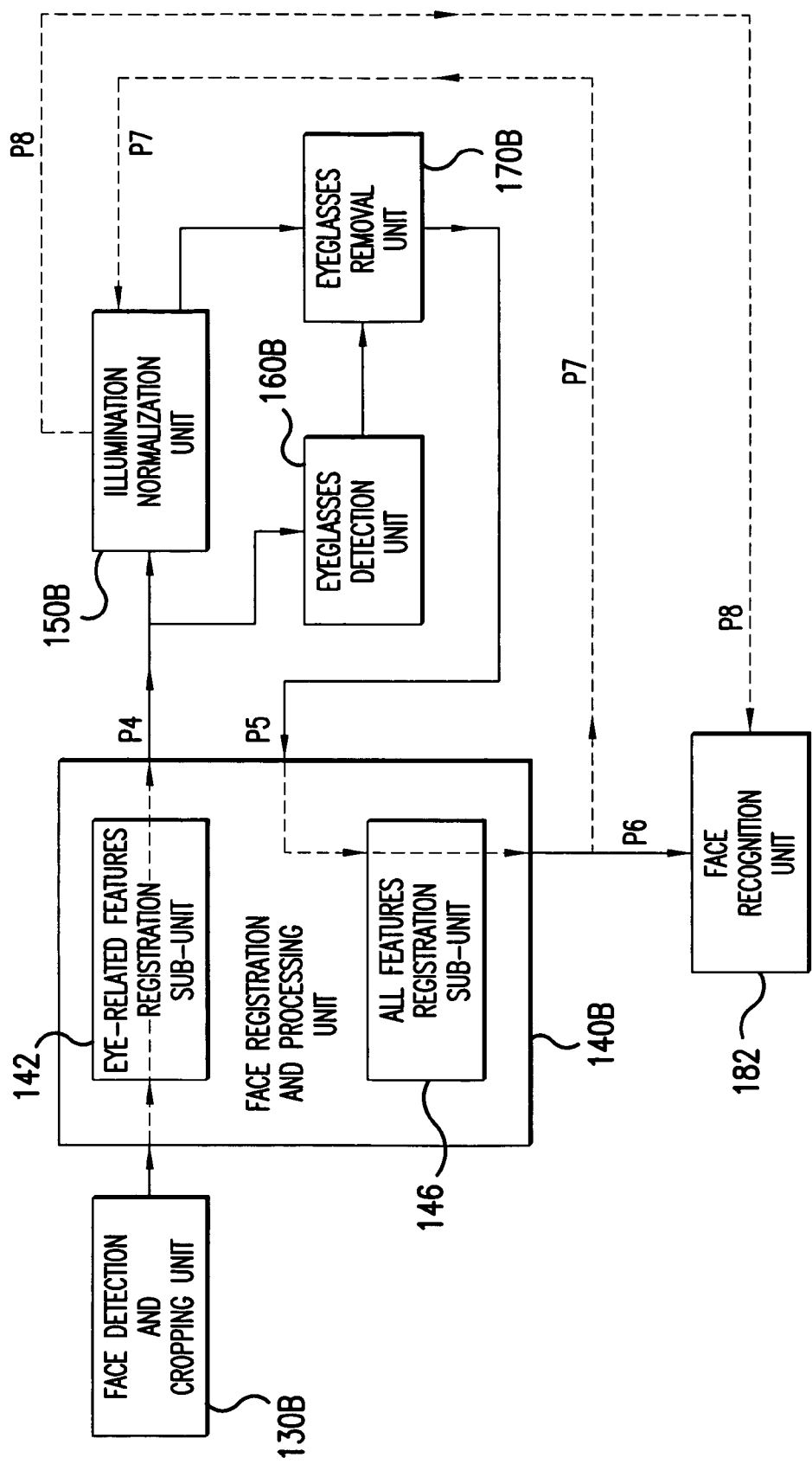
FIG. 10B is a block diagram illustrating in more detail aspects of an image processing unit for face recognition according to a third embodiment of the present invention illustrated in FIG. 10A.

FIG. 10B is a block diagram illustrating in more detail aspects of an image processing unit 40B for face recognition according to a third embodiment of the present invention illustrated in FIG. 10A. FIG. 10B illustrates the face registration unit 140B together with the units for which it provides image data for automatic eyeglasses removal and face classification. Image data passes through eye-related features registration sub-unit 142 included in face registration unit 140B, to eyeglasses removal unit 170B (on path P4), then back to face registration unit 140B through all features registration sub-unit 146 (on path P5), and next out to face recognition unit 182 on path P6. Optionally, image data output from all features registration sub-unit 146 may be sent back to illumination normalization unit 150B on path P7. The image data is normalized a second time by illumination normalization unit 150B, and then sent to face recognition unit 182 on path P8. The first face registration improves eyeglasses removal and detection. Eye-related features registration sub-unit 142 may use an eye bridge mask. The size of the eye bridge mask may be varied to produce robust results.

Overall performance of the embodiments for eyeglasses detection and removal and face classification described in the current application was tested using training data and testing data. Training data included 13,000 images from 950 identities for face classification, 870 images for eyeglasses detection, and 10,000 pairs of images from 100 identities for eyeglasses removal.

Testing data for face classification included 750 identities. The table below summarizes the results of testing. AEGDR stands for automatic eyeglasses detection and removal as described in the current application. The column of data titled "w/o AEGDR" shows the equal error rates for face classification in images with and without eyeglasses, when eyeglasses detection and removal was not performed on testing data. The column of data titled "w/ AEGDR" shows the equal error rates for face classification of images with and without eyeglasses, when automatic eyeglasses detection and removal in face images with and without eyeglasses, as described in the current application, was performed before face classification. As is can be seen in from the table below, the equal error rates are smaller when automatic eyeglasses detection and removal as described in the current application was performed before face classification.

| Test data | w/o AEGDR | w/ AEGDR |
|---|---|---|
| Images w/ eyeglasses | 0.1768 | 0.1302 |
| Images w/o eyeglasses | 0.0792 | 0.0753 |
| All images | 0.1001 | 0.0933 |

Although detailed embodiments and implementations of the present invention have been described above, it should be apparent that various modifications are possible without departing from the spirit and scope of the present invention.

I claim:

1. A method of automatically detecting and removing eyeglasses from an image, said method comprising:
   accessing digital image data representing an image including a face which was taken under an arbitrary illumination condition;
   detecting eyeglasses in said image to produce a report about presence or absence of eyeglasses in said image;
   normalizing the illumination condition under which said image was taken to obtain a normalized image which is an image with a predetermined illumination condition;
   removing eyeglasses from said normalized image to obtain a face image without eyeglasses; and
   displaying said face image without eyeglasses on a display unit.

2. The method of automatically detecting and removing eyeglasses from an image as recited in claim 1, further comprising:
   preprocessing said digital image data by detecting said face in said image, and cropping said image to obtain a cropped image including said face to be used by said detecting eyeglasses step.

3. The method of automatically detecting and removing eyeglasses from an image as recited in claim 2, further comprising:
   performing face registration of said cropped image including said face before said detecting step and before said normalizing step.

4. The method of automatically detecting and removing eyeglasses from an image as recited in claim 1, further comprising:
   performing face recognition including face classification of said face image without eyeglasses.

5. The method of automatically detecting and removing eyeglasses from an image as recited in claim 2, further comprising:
   performing a first face registration of said cropped image including said face before said detecting step and before said normalizing step,
   performing a second face registration of said face image without eyeglasses using eye related features and other features, and
   performing face recognition including face classification after said step of performing a second face registration.

6. The method of automatically detecting and removing eyeglasses from an image as recited in claim 1, further comprising:
   normalizing illumination of said face image without eyeglasses to obtain a normalized no-eyeglasses image, and
   performing face recognition including face classification for said normalized no-eyeglasses image.

7. The method of automatically detecting and removing eyeglasses from an image as recited in claim 1, further comprising:
   learning eyeglasses detection using pairs of training images including faces with and without eyeglasses.

8. The method of automatically detecting and removing eyeglasses from an image as recited in claim 1, further comprising:
   learning eyeglasses removal using pairs of training face images including eyeglasses training face images and no-eyeglasses training face images.

9. The method of automatically detecting and removing eyeglasses from an image as recited in claim 8, wherein said step of learning eyeglasses removal includes
   concatenating pixels from said pairs of training face images into a vector,
   finding principal components, means, and eigenvalues of said vector using principal component analysis,
   separating said principal components and said means into principal components and means for said eyeglasses training face images, and principal components and means for said no-eyeglasses training face images, and
   calculating a maximum a posteriori projection matrix using said eigenvalues, said principal components and said means for said eyeglasses training face images, and said principal components and said means for said no-eyeglasses training face images.

10. The method of automatically detecting and removing eyeglasses from an image as recited in claim 9, wherein said step of removing eyeglasses from said normalized image includes
    estimating said face image without eyeglasses using said maximum a posteriori projection matrix from said learning eyeglasses removal step.

11. An apparatus for automatically detecting and removing eyeglasses from an image, said apparatus comprising:
    an image data unit for providing digital image data representing an image including a face which was taken under an arbitrary illumination condition;
    an eyeglasses detection unit for detecting eyeglasses in said image to produce a report about presence or absence of eyeglasses in said image;
    an illumination normalization unit for normalizing the illumination condition under which said image was taken to obtain a normalized image which is an image with a predetermined illumination condition;
    an eyeglasses removal unit for removing eyeglasses from said normalized image to obtain a face image without eyeglasses; and
    a display unit for displaying said face image without eyeglasses.

12. The apparatus according to claim 11, further comprising:
    a face detection and cropping unit for detecting said face in said image, cropping said image to obtain a cropped image including said face, and sending said cropped image to said eyeglasses detection unit and to said illumination normalization unit.

13. The apparatus according to claim 12, further comprising:
    a face registration unit for performing a first face registration of said cropped image including said face, and sending said cropped image to said illumination normalization unit and to said eyeglasses detection unit.

14. The apparatus according to claim 13, further comprising:
    a face recognition unit for performing face recognition including face classification of said face image without eyeglasses.

15. The apparatus according to claim 14, wherein said face registration unit performs
    a second face registration of said face image without eyeglasses using eye related features and other features, and said face recognition unit performs face recognition including face classification of said face image without eyeglasses after said second face registration.

16. The apparatus according to claim 14, wherein said illumination normalization unit normalizes illumination of said face image without eyeglasses to obtain a normalized no-eyeglasses image, and said face recognition unit performs face recognition including face classification for said normalized no-eyeglasses image.

17. The apparatus according to claim 11, further comprising:
an eyeglasses learning unit for learning eyeglasses detection using pairs of training images including faces with and without eyeglasses.

18. The apparatus according to claim 11, further comprising:
an eyeglasses removal learning unit for learning eyeglasses removal using pairs of training face images including eyeglasses training face images and no-eyeglasses training face images.

19. The apparatus according to claim 18, wherein said eyeglasses removal learning unit learns eyeglasses removal by
concatenating pixels from said pairs of training face images into a vector,
finding principal components, means, and eigenvalues of said vector using principal component analysis,
separating said principal components and said means into principal components and means for said eyeglasses training face images, and principal components and means for said no-eyeglasses training face images, and
calculating a maximum a posteriori projection matrix using said eigenvalues, said principal components and said means for said eyeglasses training face images, and said principal components and said means for said no-eyeglasses training face images.

20. The apparatus according to claim 19, wherein said eyeglasses removal unit removes eyeglasses from said normalized image by
estimating said face image without eyeglasses using said maximum a posteriori projection matrix obtained by said eyeglasses removal learning unit.

* * * * *